Nov. 14, 1967 J. A. SWENSON 3,352,572
WRITING PAD
Filed Sept. 24, 1965
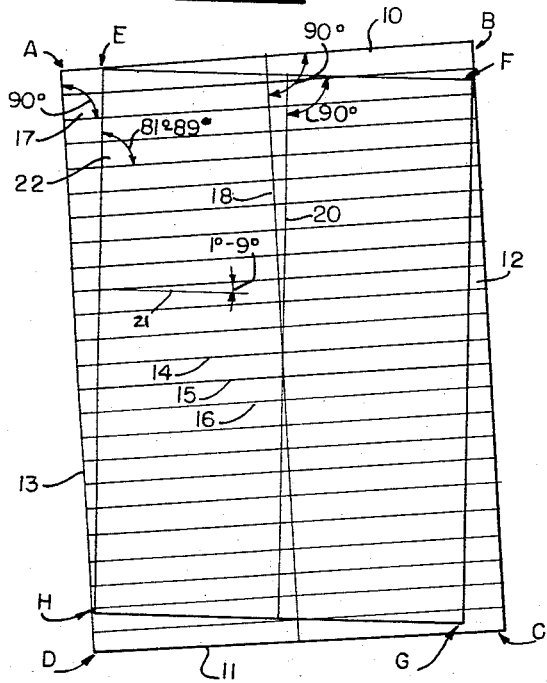
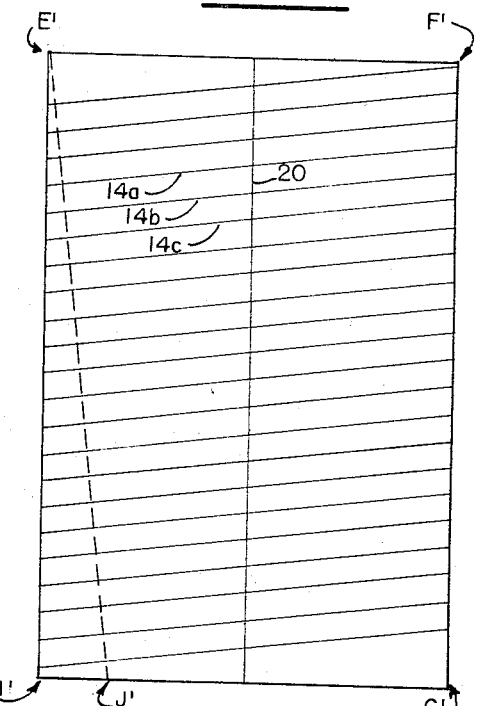
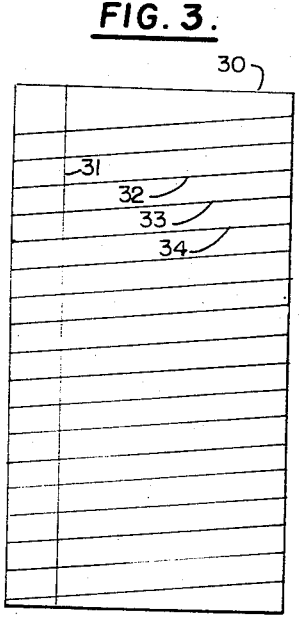
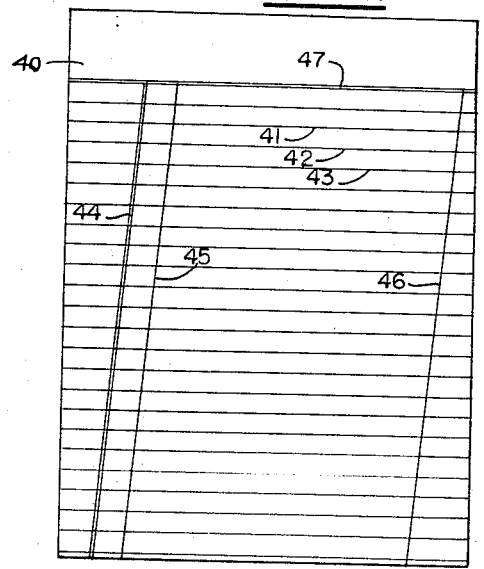
INVENTOR
Julius A. Swenson
BY
ATTORNEYS

United States Patent Office 3,352,572
Patented Nov. 14, 1967

3,352,572
WRITING PAD
Julius A. Swenson, 7217 Wayne Drive,
Annandale, Va. 22003
Filed Sept. 24, 1965, Ser. No. 489,998
3 Claims. (Cl. 283—45)

The present invention relates to writing sheets formed as individual sheets, or assembled into book or pad form; and is more particularly concerned with an improved such sheet or book characterized by a new relationship between guide lines formed on the sheet and the physical boundaries of the sheet itself.

As will appear hereinafter, the improved writing sheet of the present invention gives proper consideration to several physiological factors, i.e., first, the line of sight of the writer is at one angle; second, the writing arm and the hand is normally set at another angle; and third, the left arm and hand used to hold the writing pad or book is set at still another angle. The present invention accommodates all of these angular factors and, in so doing, provides a writing sheet wherein the writing space provided on said sheet and the vertical lines which bound said writing space line up more perfectly with the normal line of sight of the writer. The horizontal writing lines are disposed at an angle to vertical lines on the sheet, as well as to boundary edges of the sheet, with the result that the writing hand is automatically repositioned relative to a line being written upon so as to minimize obscuring of that line and of the vertical dividing line by the writing hand. The arrangement, moreover, causes each line to start somewhat farther to the left at the left hand edge of a sheet in relation to other lines on the sheet than the line previously written. With the sheet in proper writing position, each writing line starts directly under the preceding line insofar as the writer is concerned, rather than to the right of a preceding line as is the case in conventional sheets; and this permits a complete page to be written more easily than has been the case heretofore, while, at the same time, facilitating the reading of material already written.

In addition, as will appear, the writing sheet or pad need not be tilted to provide inclined horizontal writing lines; and this permits the pad to be held in the left hand of the writer in a more natural position, and eliminates the need to hold the left edge of the pad by pressure of the writer's thumb and fingers. In addition, since the sheet can be conveniently written upon in a vertical position, the sheet can be better utilized and shifted in a small or cramped table area than is the case when the sheet must be tilted to one side for writing purposes as is now conventional. As an overall result, therefore, material may be more quickly and conveniently written on my pad, and read therefrom in a writing position, than has been the case heretofore.

It is accordingly an object of the present invention to provide an improved writing pad having a new relationship of horizontal guide lines to the physical boundaries of the pad, or to the physical boundaries of writing sheets forming a portion of the pad.

Another object of the present invention resides in the provision of an improved writing surface having horizontal guide lines thereon inclined at an angle to the vertical edges of the pad or writing sheet, and inclined at an angle to vertical guide lines on the pad.

Still another object of the present invention resides in the provision of a pad having a unique guide line configuration which facilitates writing on the pad without the writing hand obscuring material or portions of the pad; which facilitates holding of the pad; and which permits more efficient utilization of the pad, and of the writing space thereon.

In providing for the foregoing objects and advantages, the present invention is characterized by the provision of a writing surface having a generally rectangular configuration. One or more vertical guide lines may, if desired, be provided on the pad; and when they are so provided, the vertical guide line or guide lines are disposed at right angles to the upper and lower edges of the pad, and extend parallel to the vertical edges of the pad, all as has been customary heretofore in connection with such vertical guide lines. The horizontal guide lines, however, do not extend at right angles to the vertical edges or lines on the pad, but are disposed at an angle to these vertical lines. More particularly, the horizontal guide lines are positioned at an angle of between one degree and nine degrees to the horizontal, so as to form angles of between 81° and 89° with the vertical lines or edges of the pad. When such angularly inclined horizontal guide lines are provided on the pad, the pad itself need not be tilted in a counterclockwise direction (or need not be tilted through as large an angle in that direction as has been conventional heretofore) in order to provide a proper angle between the pad and the writer's line of sight, and a proper angle between the horizontal guide lines and the writer's writing hand. These angular relationships thus permit better utilization of the writing surface, and facilitates both writing and reading of material.

The foregoing objects, advantages, construction and operation of the present invention will become more readily apparent from the foregoing description and accompanying drawings, in which:

FIGURE 1 diagrammatically illustrates the derivation, and advantages, of a writing sheet constructed in accordance with the present invention;

FIGURE 2 illustrates one form of writing sheet constructed in accordance with the present invention;

FIGURE 3 illustrates another form of writing sheet constructed in accordance with the present invention; and FIGURE 4 illustrates a still further embodiment of the present invention.

Referring now to FIGURE 1, one typical form of writing sheet has been designated by the rectangle A, B, C, D. This particular writing sheet comprises upper and lower edges 10 and 11 disposed parallel to one another, and side edges 12 and 13 also disposed parallel to one another and perpendicular respectively to the upper and lower edges 10 and 11. The overall configuration is rectangular; and the sheet typically includes a plurality of guide lines 14, 15, 16, etc., which extend in generally parallel relation to one another parallel to the upper and lower edges 10 and 11 of the sheet, and at right angles to the side edges 12 and 13 of the sheet, as indicated at 17. In the case of a stenographer's notebook, it is conventional for the overall sheet to be vertically divided into two equal sections by means of a vertical guide line 18 disposed parallel to the sides 12 and 13 and mid-way therebetween.

In effecting any form of hand writing, whether it be long hand or shorthand, it is customary to tilt the writing sheet A, B, C, D through an angle in a counterclockwise direction (for a right handed writer) in order to conform the lines on the sheet somewhat to the normal line of sight of the writer, and to accommodate the customary angle of the writing arm and hand. The sheet A, B, C, D has accordingly been shown as so tilted in FIGURE 1. When the sheet is so moved angularly, the vertical center line 18 of the sheet, and the vertical edges 12 and 13 of the sheet do not line up with the line of sight. Instead, the vertical lines intersect the line of sight at a disagreeable and tiring angle. The space on which any material is written also lies at this same angle; and, as a result, part of the previously written symbols (those along the right-hand margin 12) are hard to scan and refer to from a writing position without shifting the page or book.

As a practical matter, with the sheet A, B, C, D in the tilted position shown in FIGURE 1, only a portion of the sheet can be easily scanned or referred to from the writing position without shifting the page once more; and this portion of the sheet has been designated E, F, G, H. The portion of the sheet designated F, C, G represents space in a conventional stenographic pad that is very difficult to scan from a writing position; and, for all practical purposes, this area is either wasted, or requires undesirable movement of the writer's hand to permit reading of the sheet. It will, moreover, be noted that the various horizontal guide lines 14, 15, 16, etc. commence at positions which are successively displaced to the right when the sheet A, B, C, D is disposed in its normal tilted position for writing purposes. This in turn requires that the writer, as he goes from one line to the next, must either shift his entire arm and hand to the right, or that the writer cock the wrist of his writing hand in a successively increasing backward direction. Either circumstance tends to impose certain discomforts in the writing operation, which discomforts have been merely tolerated (and, indeed, the reasons for the discomfort have not been recognized) heretofore.

The present invention recognizes, in essence, that the sheet portion E, F, G, H shown in FIGURE 1, when associated with the several writing lines 14, 15, 16, etc., comprises a sheet surface which avoids the various difficulties mentioned. The sides of this sheet surface F, G, and E, H, respectively, are disposed substantially vertically, thereby minimizing disruptions between the sheet edges and the normal line of sight. At the same time, the guide lines 14, 15, 16, etc. are disposed at a proper angle for writing even though the sheet surface E, F, G, H is itself in a vertical orientation, untilted to the left. In order to further minimize discontinuities between guide lines and the normal line of sight, the vertical center line 18 of the sheet can be displaced to the position of line 20, i.e., to a position mid-way between the side E, H, and F, G of the sheet surface, and at right angles to the upper and lower edges E, F and G, H of the writing surface.

If we now consider the surface E, F, G, H, it will be seen that the upper and lower edges of this surface extend in truly horizontal directions, and the side edges of this surface extend in truly vertical directions. Moreover, the center line 20 associated with the surface also extends in a truly vertical direction. At the same time, the horizontal guide lines 14, 15, 16, etc., are disposed at an angle to both the side edges and center line of the sheet E, F, G, H. This angular positioning is such that the various horizontal guide lines 14, 15, 16, etc. are displaced from true horizontal by an angle of between 1° and 9° as indicated at 21; and the said lines 14, 15, 16, etc., accordingly make an angle of between 81° and 89° with the vertical side edges of the sheet, and with the vertical center line of the sheet, as indicated at 22. The actual angle which the various writing lines 14, 15, 16, etc., should make to the vertical side edges and vertical center line of the writing surface depends to a certain extent upon the preference of a particular writer, as dictated by his physical proportions; but I have found that if the angular inclination from true horizontal is somewhere within the range from 1° to 9°, and preferably in the order of 5° to 7°, the advantages to be derived from the invention will be appreciated by the great majority of writers. In practice, however, sheet surfaces of the type shown at E, F, G, H can be marketed with lines at the various different angles to the vertical edges of the sheet, so that a particular writer can select that line inclination which he finds to be most comfortable, i.e., certain pads can be sold with the lines at 1 to the horizontal, others could be sold with lines at 2° to the horizontal, etc.

FIGURE 2 illustrates a typical writing sheet prepared in accordance with the considerations discussed in reference to FIGURE 1; and in order to relate the showing of FIGURE 2 to that of FIGURE 1, the writing sheet of FIGURE 2 has been designated E', F', G', H'. The sheet of FIGURE 2 can be the same size as the sheet A, B, C, D of FIGURE 1. The sheet includes a vertical center line 20 and also includes a plurality of inclined writing lines 14a, 14b, 14c, etc., each of which is inclined to true horizontal by an angle of between 1° and 9°, thereby making an angle of between 81° and 89° with the vertical edges of the sheet and with the center line 20 thereof. In writing on the sheet of FIGURE 2, the sheet can be held vertically in the left hand, or can be laid on a table in a vertical position. The angle formed by the intersection of the inclined writing lines 14a, 14b, 14c, with the vertical edges of the sheet and with the vertical center line 20 actually stimulates writing; and, moreover, helps to establish the general angle or slant in shorthand characters, none of which are at right angles.

The vertical lines, as well as the edges of the page (which are also vertical) are more in line with the line of sight of the writer. Moreover, it will be noted that each successive writing line starts directly under the beginning of the preceding line in relation to the writer's hand, instead of to the right of a preceding line as in the case of conventional sheets; and this makes the whole body of the written material, and the entire page, easier to read from a writing position. Since writing is done mostly from the elbow area as a pivot, moreover, it is more natural to shift the writing hand for each new line than is the case for the conventional style book discussed in reference to FIGURE 1. In writing on the sheet of FIGURE 2, the writing hand has a lesser tendency to obscure the vertical guide or division line. Accordingly, a quicker decision can be made to continue a particular line, or to end it and start a new line.

A broken line E', J' has been drawn on the representation of FIGURE 2 to delineate an area E', J', H' which, in practice, represents a space on the page which is easier to read than any in a conventional book. In effect, therefore, the angular tilting of the various writing lines 14a, 14b, 14c, etc., tends to facilitate both writing on the page, and reading of material therefrom.

The sheet of FIGURE 2 may be made in various sizes, with various spacings between the several writing lines. Moreover, it is not necessary that a vertical line such as 20 be provided. Even without such a line, the angular inclination between the several generally horizontal writing lines and the vertical edges of the page effect the various advantages described previously. Moreover, when it is desired to include a vertical guide line, it is not mandatory that this guide line be disposed mid-way between the vertical edges of the page. It is possible that the vertical guide line could comprise a margin line; and one such arrangement is shown in FIGURE 3. In this particular figure, the writing sheet has been designated 30, and includes a vertical guide line 31 disposed adjacent the left-hand margin, as well as a plurality of inclined writing lines 32, 33, 34, etc., which are inclined at an angle to the horizontal, and which extend at an angle of between 81° and 89° to the vertical edges of the sheet 30 as well as to the margin line 31 thereon.

A still further embodiment of the present invention affording many of the advantages discussed previously is shown in FIGURE 4. In this embodiment, the sheet 40 is again of rectangular configuration; but the horizontal writing lines 41, 42, 43, etc., extend parallel to the top and bottom boundaries of the sheet and at right angles to the sides of the sheet. Generally vertical guide lines 44, 45 may be provided adjacent the left edge of the sheet, and a still further generally vertical guide line 46 may be provided adjacent the right edge of the sheet. These guide lines 44, 45, 46 are angularly inclined to the edges of sheet 40, so that the angles of intersection between the writing lines 41, 42, 43 and the guide lines 44, 45, 46 provide the angular relationships previously discussed in referencse to FIGURES 1 through 3, inclusive. To this effect, therefore, the guide lines 44, 45, 46, rather than being positioned at right angles to the top and bottom edges of sheet 40, define angles of between 81° and 89° to said top and bottom sheet edges, and fine angles of between 1° and 9° to the side edges of the sheet.

As a result, the overall rectangular sheet 40 embodies an area bounded, for example, by the lines 44 and 46, by the bottom edge of sheet 40, and by an uppermost guide line 47, which presents a disposition of lines and a writing surface corresponding to the disposition already discussed in reference to FIGURES 1, 2, and 3. Indeed, it will be seen by comparison of FIGURES 1 and 4, that the embodiment of FIGURE 4, in essence, corresponds to the sheet of FIGURE 1 with the areas A, E, H and F, G, C, left on the original sheet.

Due to the form of sheet used in the embodiment of FIGURE 4, some of the advantages discussed for my other embodiments are not as readily obtainable, i.e., since the sheet is normally written upon by tilting the sheet 40 so as to place the lines 44, 45, 46 in a generally vertical position, the sheet requires as much space as conventional sheets when only a cramped writing surface is available. Nevertheless, the major advantage of causing the lines to better conform to the line of sight is effected in the embodiment of FIGURE 4, particularly in respect to the main writing area of the sheet; and the side boundaries of sheet 40 are not so obtrusive as to cause any appreciable conflict with the line of sight.

While I have thus described preferred embodiments of the present invention, many variations will be suggested to those skilled in the art. It must, therefore, be understood that the foregoing description is meant to be illustrative only and should not be considered limitative of my invention. All such variations and modifications as are in accord with the principles described are meant to fall within the scope of the appended claims.

Having thus described my invention, I claim:

1. A portable writing pad comprising a plurality of assembled superposed sheets adapted to be written upon in succession with each sheet adapted to produce a body of written material skewed to the edges of said pad, each of said sheets being of rectangular shape having a pair of elongated side edges extending in spaced parallel relation to one another and also having parallel top and bottom edges extending at right angles to said side edges, each of said writing sheets in said pad having a plurality of writing lines thereon extending in parallel relation to one another between said side edges, said writing lines each defining an angle of between 1° and 9° to said top and bottom edges.

2. The writing pad of claim 1 including a guide line on each of said sheets extending between said top and bottom edges at right angles to said top and bottom edges.

3. The writing pad of claim 2 wherein said guide line is equidistant from said pair of side edges.

References Cited
UNITED STATES PATENTS
| | | | |
|---|---|---|---|
| 1,012,739 | 12/1911 | Speckel | 35—37 |
| 1,253,970 | 1/1918 | Higgins | 35—37 |

FOREIGN PATENTS
| | | |
|---|---|---|
| 138,776 | 6/1901 | Germany. |
| 35,674 | 3/1912 | Sweden. |

LAWRENCE CHARLES, *Primary Examiner.*